United States Patent [19]
Ferrar

[11] Patent Number: 5,170,225
[45] Date of Patent: Dec. 8, 1992

[54] DETERMINING OPTICAL SIGNAL TRANSIT DELAY TIME IN AN OPTICAL INTERFEROMETER

[76] Inventor: Carl M. Ferrar, 114 Wildflower Rd., East Hartford, Conn. 06118

[21] Appl. No.: 658,808

[22] Filed: Feb. 22, 1991

[51] Int. Cl.$^5$ ............................................. G01C 19/72
[52] U.S. Cl. ................................................. 356/350
[58] Field of Search ....................................... 356/350

[56] References Cited
FOREIGN PATENT DOCUMENTS
3104786 9/1982 Fed. Rep. of Germany ...... 356/350

Primary Examiner—Samuel Turner

[57] ABSTRACT

In a fiber optic gyroscope 10 having a pair of light waves counter-propagating in a fiber optic loop 44, a phase modulator 28 driven with a variable frequency and amplitude modulation signal on a line 32 so as to null any rotation induced optical phase shift, and using the difference between the drive frequency and the loop eigenfrequency as a measure of rotation rate, is provided with a calibration circuit which determines the actual loop eigenfrequency while in rotation. A modulation signal is applied having an amplitude that causes the closed loop output frequency to equal the loop eigenfrequency independent of rotation rate. The amplitude is fine tuned by applying a phase dither and adjusting the amplitude until effects of the dither are minimized.

10 Claims, 4 Drawing Sheets

DETERMINING OPTICAL SIGNAL TRANSIT DELAY TIME IN AN OPTICAL INTERFEROMETER

TECHNICAL FIELD

This invention relates to optical interferometers and more particularly to determining the optical propagation (transit time) delay incurred by a signal traveling in a fiber optic loop.

BACKGROUND ART

It is known in the art that a specific type of optical interferometer known as a fiber optic gyro (FOG) uses the theory of relative motion to calculate the angular velocity or rotation rate of a body. A FOG typically consists of a light source, an optical loop, a beam splitter and combiner, a phase modulator, and an optical detector. Typically a light wave is injected into both ends of a single fiber optic cable shaped in a circle (called a ring or loop). The beam splitter serves to split the light wave from the light source into two substantially equal waves and sends them propagating in opposite directions around the optical loop. The beam combiner serves to combine the waves after they have traveled around the loop and the optical detector measures the intensity of the combined wave. The beam splitter and combiner is typically one component. One or more phase modulators, placed in one or both ends of the loop, may be used to induce a phase shift between the waves.

When the optical ring is at rest, i.e., not subject to rotation, the two counter propagating light waves, combined by the beam combiner and monitored by the optical detector, will be exactly in phase because the distance traveled by both waves is exactly the same. When the waves are in phase, they combine for a maximum intensity at the optical detector. When the ring is rotated about an axis normal to the plane of the ring, the wave traveling in the direction of rotation will require more time to reach the end of the fiber (where the waves are combined), than the wave traveling in the opposite direction. This occurs because the detector is moving away from one wave and toward the other. Therefore, the length of travel is shorter for one wave than the other. This path difference causes a nonreciprocal (differential) phase shift between the two waves such that when the waves are combined, the optical intensity is not a maximum. The phase shift induced by the angular rotation rate of the ring is known as the "Sagnac" effect.

For the purpose of closed loop operation, as is known in the art, such phase shift can be compensated for, i.e., nulled, by imposing a phase shift on the waves equal and opposite to the rotation induced (Sagnac) phase shift such that the phase difference between the waves is brought to zero, restoring the maximum intensity at the optical detector. The phase shift imposed to produce the desired null in closed loop operation serves as a measure of rotation rate and provides the same starting intensity for each rotation rate thereby providing consistent sensitivity to rotation rate measurement. There are various techniques for imposing this phase shift to null the Sagnac phase shift, one of which is a periodic ramp (also known as a sawtooth waveform, or serrodyne waveform) applied to parallel electrode plates located around optical waveguides at one or both ends of the optical loop. A voltage applied to the plates induces a proportional phase shift in the waves propagating between the plates. By controlling either the amplitude or the frequency of the waveform one can inject various phase shifts at different times on the waves. For example, in a fixed amplitude serrodyne modulation closed loop FOG, the change in serrodyne ramp frequency needed to null the Sagnac phase is proportional to the rotation rate of the ring.

In addition to using a serrodyne waveform to counteract the rotationally induced Sagnac phase difference, a technique is typically employed to increase the sensitivity of the closed loop system to changes in rotation. One such technique utilizes the property that the combined wave intensity behaves like a vertically shifted (raised) cosine curve (i.e., a curve with a non-zero average value having the negative-most point at zero), where the intensity seen at the optical detector is related, by this curve, to the phase difference induced by rotation. When the ring is at rest, the combined wave intensity is at a maximum and thus the intensity is at the peak of the cosine curve. However, at the peak, the sensitivity is at a minimum because the slope is effectively zero at this point. Therefore, any change in phase shift will produce a minimal change in intensity, yielding minimal sensitivity. What is commonly done in the art to increase sensitivity is to shift the operating point, or the non-rotation null, from the maximum of the cosine curve to a region where the slope is much steeper, i.e., at either $\pi/2$ or $-\pi/2$. This can be accomplished by applying a constant or DC phase shift (or DC sensitizing source). However, if a DC phase shift is induced at $\pi/2$, the steep slope of the cosine curve at $\pi/2$ creates a high sensitivity to phase changes requiring a very stable and accurate DC source to avoid erroneous rotation rate readings. It can be difficult to achieve a very constant DC phase shift over time, and any change in this DC shift will induce an incorrect indication of rotation rate. Instead, systems will typically modulate or change the operating point in time from one side of the cosine curve where the intensity is most sensitive, to the other side of the cosine curve where it is also most sensitive. This modulation is hereinafter referred to as a sensitizing oscillation (i.e., AC sensitizing). This is achieved by driving the modulator with a waveform such that the phase shift between the counter-propagating waves varies in a known way. If such a modulation source is used to improve sensitivity, a demodulator is needed at the output of the optical detector to detect signal components generated by rotation. Typically what is used is a synchronous demodulator driven at the same frequency as the sensitizing oscillator source (also known as the fundamental frequency). This is also referred to in the literature as a lock-in amplifier. When a phase shift occurs, due to rotation, components at the output of the demodulator change in a predictable way allowing the calculation of rotation rate.

A typical closed loop fiber optic gyro will contain both a sensitizing oscillator and a synchronous demodulator, as well as a sawtooth waveform driver placed in a closed loop configuration. The sensitizing oscillator and synchronous demodulator are provided for improved sensitivity and the sawtooth waveform generator is provided to close the loop, e.g., to null any phase differences due to rotation rates. Therefore, in a closed loop serrodyne waveform FOG, both the sensitizing oscillator and the sawtooth waveform are simultaneously applied to the optical phase modulator. For a given rotation rate there will exist a corresponding frequency and amplitude of the sawtooth waveform that will null the induced phase shift.

Although it is possible to drive the optical phase modulator with a "zero" frequency sawtooth waveform when the ring is at rest, it is known that using a non-zero frequency may be more practical. When at rest there are numerous ramp frequencies, including zero, which will null the gyro output. If the frequency selected is zero, the non-rotating phase shift will remain at null independent of variations in certain physical parameters of the FOG. However, using "zero" frequency may be impractical because it requires a very accurate reversal of ramp polarity when the rotation direction reverses. If this accuracy is not achieved, large errors may result. An alternative to using "zero" frequency is to use one of the non-zero output nulling frequencies when the gyro is at rest. However, the allowable non-zero output nulling frequencies may drift as physical parameters of the FOG change. This drift will create a false indication of phase shift causing an erroneous rotation rate indication thereby degrading the accuracy in measuring FOG rotation rate.

More specifically, it is known that a FOG produces accurate rotation measurements when the zero rotation output nulling frequency is set to some integer multiple of the loop eigenfrequency, Fe. This frequency is defined as half the reciprocal of the loop delay time T and is related to physical parameters of the system by the following relationship:

$$Fe = \tfrac{1}{2}T = C/2nL \qquad (1)$$

where C is the speed of light in a vacuum; n is the index of refraction for the loop optical medium; and L is the length of the loop optical fiber or waveguide. Equation 1 shows that the loop eigenfrequency (Fe) will change with changes in either n or L. For example, a change in temperature will cause a change in the length L of the loop. Additionally, a change in temperature may cause a change in the optical properties of the fiber and therefore, a change in the fiber refractive index. These changes in the fiber length and refractive index change the loop transit time, and therefore, the loop eigenfrequency (Fe).

In the closed loop fixed amplitude serrodyne drive FOG, when the ring is at rest, the drive frequency (Fd) is driven to the loop eigenfrequency (Fe) or a multiple thereof, n.Fe, to achieve the nonrotation intensity setpoint (null point). When the ring is subjected to a rotation rate, closed loop control logic will force the drive frequency to a new value to achieve the nonrotation phase shift. This change in drive frequency is proportional to rotation rate. This technique is accurate provided the Fe in the control logic (with respect to which the change is measured) matches the loop Fe of the FOG. However, if the physical characteristics of the FOG change, causing the loop Fe to change, there will be a corresponding intensity change that the control logic will compensate for by changing the drive frequency to maintain the nonrotation intensity. This intensity change is induced by the periodic modulation drive waveform acting on the counter-propagating waves whose propagation time has been changed by the change in the physical characteristics. Because the control logic is unaware of the loop Fe shift, this change in drive frequency will manifest itself as an erroneous rotational reading.

It is also known in the art that, to achieve optimal performance, the fundamental frequency for the sensitizing oscillator and the synchronous demodulator can be set at Fe. However, if the loop Fe drifts, this optimal performance will be compromised.

DISCLOSURE OF INVENTION

Objects of the invention include provision of nonrotating optical transit time (propagation delay) determination in a fiber optic gyro sensor employing closed loop control which reduces the sensitivity to variations of certain sensor parameters that would otherwise cause errors in rotation rate indications and which permits the determination of such transit time while the gyro is in motion.

According to a first aspect of the present invention, "on-line" calibration of a FOG is achieved by switching the amplitude of a component of the modulation waveform to a value close to one for which the time average of the optical intensity will be a predetermined constant, independent of rotation rate. To achieve this amplitude more exactly, a synthesized rotation rate variation (phase dither) is injected to the phase modulator in addition to the other signals. This rotation variation is monitored while varying the amplitude to achieve the exact amplitude that provides insensitivity to this induced variation. Once this amplitude is reached, the sawtooth output frequency of the closed loop system provides the necessary information to determine the optical transit time that would exist in the absence of rotation, i.e., the transit time associated with the current values of the physical parameters in the system. Once this nonrotation transit time is known, the system can be adjusted to compensate for it thereby minimizing the effects of variations in this transit time.

According to a second aspect of the invention, an independent modulation waveform is simultaneously applied to the phase modulator along with other normally applied waveforms. This additional waveform is driven at an amplitude to provide insensitivity to rotation rate (as hereinbefore described), and may also include a synthesized rotation rate variation for fine tuning the precise amplitude. This technique provides a continuous output of optical transit time in real time and avoids the overhead of switching waveforms.

A further advantage of the present invention is that if the system employs an AC sensitizing oscillator and the oscillator uses the loop eigenfrequency Fe (which is directly related to the loop transit time) to derive its fundamental frequency, knowing the loop Fe will allow adjustment of the fundamental frequency for the sensitizing oscillator and the demodulator, allowing these devices to track variations in the loop transit time, thereby maintaining optimal system performance.

The invention may be implemented in a system employing a closed loop rotation control with AC or DC sensitizing, or no sensitizing.

The foregoing and other objects, features, and advantages of the present invention will become more apparent in the light of the following detailed description of exemplary embodiments thereof, as illustrated in the accompanying drawings.

BEST MODE FOR CARRYING OUT THE INVENTION

Figure 1:
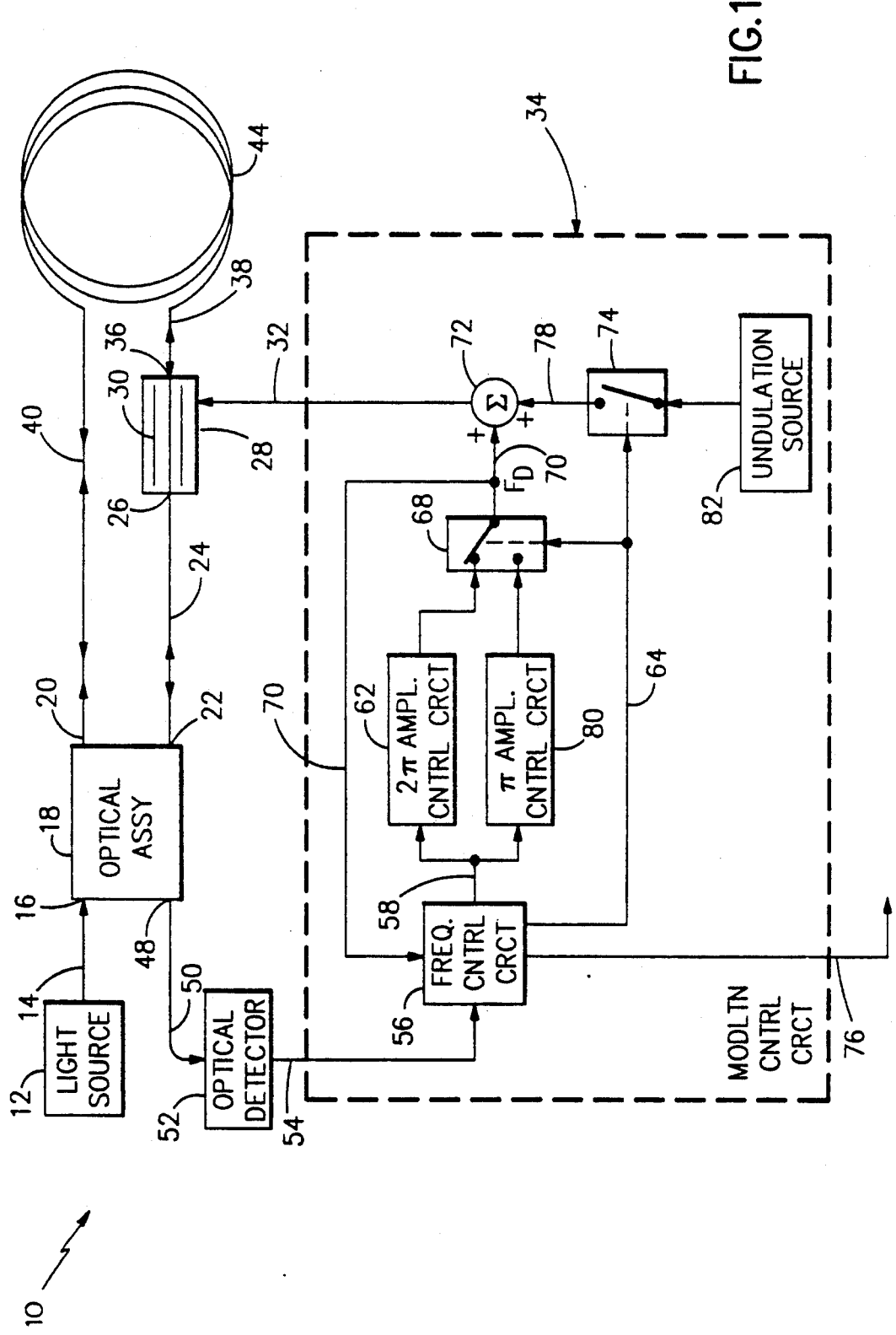
FIG. 1 is a schematic block diagram of an interferometric optical sensor having amplitude switching in a closed loop serrodyne drive configuration in accordance with a first aspect of the invention.

Referring to FIG. 1, a closed loop interferometric optical sensor, more specifically a fiber optic gyroscope (FOG) 10, includes a light source 12, e.g., a laser diode or superluminescent diode. Light from the source 12 is optically coupled by known means, e.g., through an optical fiber 14 to a port 16 of an optical assembly 18.

The optical assembly 18 contains known optical components such as beam splitters (e.g., four port fused-fiber star coupler or integrated optical Y-coupler), polarizers, and single-mode elements (e.g., single-mode fibers or waveguides). The components are arranged such that light which has entered at port 16 is first passed through a single-mode single-polarization filter, e.g., a known metallized optical waveguide segment, then split by known means, e.g., a Y-shaped integrated optical (IO) waveguide, into two waves of approximately equal intensities which then exit from the assembly 18 through two ports 20, 22.

The port 22 is optically coupled by known means, e.g., through an optical fiber 24 to a port 26, of a phase modulator assembly 28, which may alternatively be part of the optical assembly 18. An optical wave entering port 26 is directed through optical fibers or waveguides, to an optical phase modulator 30. The modulator 30 may include, an optical waveguide sandwiched between a pair of parallel electrodes by known techniques. The modulator 30 is driven by a modulation signal on a line 32 from a modulation control circuit 34. After passing through the modulator 30, the wave exits the modulator assembly 28 through a port 36. The port 36 of the modulator assembly 28 and the port 20 of the optical assembly are optically coupled through optical fibers 38, 40 respectively to opposite ends of an optical fiber 44 wound into a Sagnac sensing loop. The fiber 44 typically consists of a single-mode fiber, but may be a multi-mode fiber if desired. The loop may consist of a plurality of turns of optical fiber which may be wound on a cylindrical spool (not shown). The two waves, one exiting the port 20 of the optical assembly and the other exiting the port 36 of the phase modulator assembly counter-propagate in the loop.

After traversing the loop, the wave that exited the port 20 enters the modulator assembly at the port 36, passes through the modulator 30 and re-enters the optical assembly at the port 22. The other wave, after traversing the loop, re-enters the optical assembly at the port 20. In the optical assembly 18, the waves are recombined by known means, e.g., the aforementioned Y-shaped IO waveguides. A portion of the recombined light is split off by known means, e.g., a fused-fiber coupler, after again passing through the aforementioned single-mode single-polarization filter to ensure, as is known, reciprocal optical paths for the counter-propagating waves in the FOG in the absence of rotation.

The split-off portion of the recombined light exits the optical assembly through a port 48 and is optically coupled by known means, e.g., an optical fiber 50, to an optical detector 52, e.g., a photodiode or photodetector. The remainder of the recombined light (none of which matters to the invention) typically exits the optical assembly 18 through the port 16, and may pass through or be absorbed in the light source 12.

The optical detector 52 provides on a line 54, to the modulation control circuit 34, an electrical signal proportional to the intensity of the optical signal at the port 48 of the optical assembly 18. This optical signal represents the recombined waveform intensity.

During FOG operation the modulation control circuit 34 monitors the optical intensity on the line 54 and drives the optical phase modulator with a modulation signal on the line 32.

As is known in the art, the closed loop FOG modulation signal may be a stepped ramp or a linear ramp serrodyne signal having a fixed amplitude (or peak) and an essentially instantaneous flyback time. The terms $2\pi$ and $\pi$ radians amplitude refer to the amplitude required to induce a peak phase shift of $2\pi$ and $\pi$ radians, respectively on a given wave. Typically, a $2\pi$ radians amplitude is used in a fixed amplitude FOG. The phase modulator induces a phase difference between counter-propagating waves because it acts on the recombining waves at different times.

The modulation control circuit of the invention includes a known frequency control circuit 56, that provides an analog serrodyne waveform drive signal on a line 58 responsive to the optical intensity signal on the line 54. The frequency control circuit modulates the frequency from a nonrotation setpoint frequency (or control Fe) to null any induced differential phase shift and maintain a constant intensity averaged over the period of the serrodyne drive signal. The frequency control circuit contains known electronic components such as a lock-in amplifier (synchronous demodulator), providing an analog voltage proportional to the magnitude of frequency components in the intensity signal, driving a low pass filter, providing a voltage indicative of the time averaged intensity of the frequency components, which drives a voltage controlled oscillator (VCO) to provide a frequency proportional to the time averaged intensity.

The serrodyne drive signal is provided from the frequency control circuit on the line 58 to a known $2\pi$ amplitude control circuit 62 where it is scaled to a fixed amplitude of approximately $2\pi$ radians using known electronic components, e.g., an amplifier.

When FOG calibration is not selected (i.e. normal FOG operation), the frequency control circuit 56 provides a signal on a line 64 to cause a switch 68 to connect the $2\pi$ amplitude control circuit 62 to a line 70 which feeds one input of a summer 72 and causes a switch 74 to disconnect the signal path to the other input line 78 of the summer 72 thereby providing a modulation drive signal on the line 32 solely driven by the signal on the line 70. In this mode of operation the serrodyne drive signal frequency on the line 70 will be related to rotation rate. More specifically, the difference between the drive frequency and the nonrotation setpoint frequency (the control Fe) will be proportional to rotation rate. A signal indicative thereof is provided by the frequency control circuit 56 on a line 76 which is the FOG 10 output.

The serrodyne waveform drive signal on the line 58 is also provided to a $\pi$ amplitude control circuit 80 containing known electronic components such as a frequency to voltage converter which controls the gain of a variable gain amplifier. The $\pi$ amplitude control circuit scales the amplitude of the serrodyne drive signal on the line 58 to approximately $\pi$ radians, detects frequency variations in the serrodyne drive signal, and adjusts the amplitude to minimize such variations thereby achieving precisely a $\pi$ radians amplitude. I have found, both analytically and experimentally, that if the serrodyne amplitude is precisely equal to $\pi$ radians, the closed loop output drive frequency is precisely equal to the loop Fe (or an odd multiple thereof) independent of FOG rotation rate.

FOG calibration is selected by the output of a timer located within the frequency control circuit 56. At a predetermined rate such as once per minute, the timer initiates calibration by causing the frequency control circuit 56 to provide a signal on the line 64 to cause the switch 68 to connect the $\pi$ amplitude control circuit 80 to the line 70 which feeds the summer 72 and causes the switch 74 to connect an undulation source 82 to the other input line 78 of the summer 72 thereby providing a modulation drive signal on the line 32 which is the summation of the signals on the two lines 70, 78. The undulation signal from the source 82 provides on the line 78 a predetermined artificial rotation (phase) variation signal such as a low frequency dither, e.g., 1 HZ, as a component to the phase modulation drive signal. The dither manifests itself as a variation in drive signal frequency on the output line 58 of the frequency control circuit 56. The $\pi$ amplitude control circuit will adjust the amplitude in a direction to minimize the variation in drive frequency. When the frequency variation is extremely small or nonexistent (provided the loop Fe does not change), the amplitude of the signal is precisely $\pi$ radians. Thus, an iterative process exists whereby the frequency control circuit modulates the drive frequency to achieve the nonrotation setpoint and the $\pi$ amplitude control circuit adjusts the drive amplitude to achieve precisely $\pi$ radians amplitude. When both the drive frequency is equal to the loop Fe and the drive amplitude equals $\pi$ radians, the drive frequency will be independent of rotation rate thereby allowing determination of the loop Fe by monitoring the drive frequency.

After waiting a length of time sufficient to achieve the $\pi$ radians amplitude, such as three periods of the undulation frequency (three seconds, for an undulation frequency of 1 HZ), the frequency control circuit reads the drive frequency signal on the line 70 (which will now be equal to the loop Fe) and updates the value of the control Fe (which will update the rotation rate). Updating the rotation rate calculation may also be performed without modifying the control Fe. After updating the control Fe value, the frequency control circuit disengages the FOG calibration by providing a signal on the line 64 to cause the switch 74 to disconnect the undulation source 82, and cause the switch 68 to connect the $2\pi$ amplitude control circuit to the summer 72 and disconnect the $\pi$ radians amplitude control circuit. The system has thereby returned to the $2\pi$ amplitude closed loop configuration and is capable of measuring rotation rate.

Figure 2:
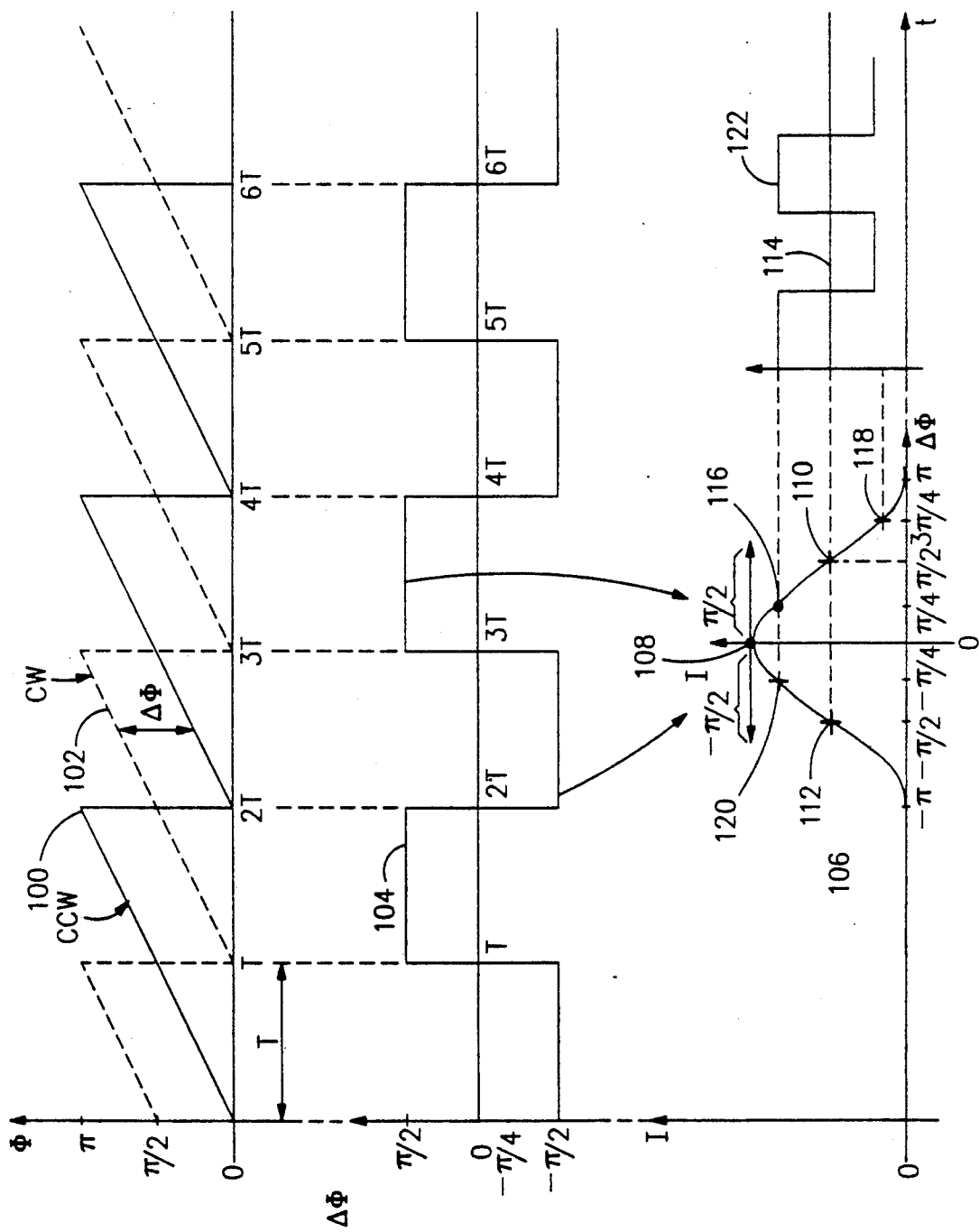
FIG. 2 is a diagram illustrating the phase shift imposed on two counter-propagating waves, the phase difference between the two, how this phase difference appears on an optical intensity curve, and the associated time history of the optical intensity.

Referring now to FIG. 2, when the driving amplitude is $\pi$ radians the optical intensity seen by the detector on a time average basis will be a constant, independent of rotation rate. The waveforms 100, 102 illustrate the $\pi$ radians amplitude serrodyne waveform and the associated phase shift $\phi$ introduced on the counterclockwise (CCW) and clockwise (CW) traveling waves, respectively. The time T represents the time it takes for the wave to traverse the loop.

The phase shift introduced between the two waves ($\Delta\phi$) can be determined by subtracting the two waveforms as shown by the curve 104. This curve 104 shows the differential phase shift introduced between the two waves to be $+\pi/2$ and $-\pi/2$ with equal times at each level. The effect of the differential phase shift $\Delta\phi$ (curve 104) upon the intensity I of the optical output signal is shown by the raised cosine curve 106.

For example, given a nonrotating operating point 108 at the top of the cosine curve 106, if the differential phase shift shown by the curve 104 is imposed on the waves, the intensity will oscillate from the point 110 to the point 112 in a periodic fashion spending equal times at each intensity. The time average output intensity in this case is equal to a constant, corresponding to a $\Delta\phi$ of $\pi/2$, shown by the curve 114. If the ring is then subject to an arbitrary rotation rate, the operating point on the intensity curve will shift to a related point, such as 116. Again, applying the differential phase shift 104 to the cosine intensity curve 106, the intensity will oscillate by $\pi/2$ from the operating point 116 to two new points 118, 120, again with equal times spent at each intensity. The curve 122 shows the time history of the intensity oscillation at the operating point 116. The time average intensity 114 is equal to the same constant value as in the previous case, independent of rotation rate. Therefore, the time average intensity seen at the optical detector will be the same constant value, independent of rotation rate, when the serrodyne waveform amplitude is set to precisely $\pi$ radians and the frequency is set to Fe. It should be noted that the time delay induced by rotation is many orders of magnitude smaller than the time T to traverse the loop, therefore no appreciable change in the time symmetry of the $\Delta\phi$ waveform 104 will occur due to rotation.

Figure 3:
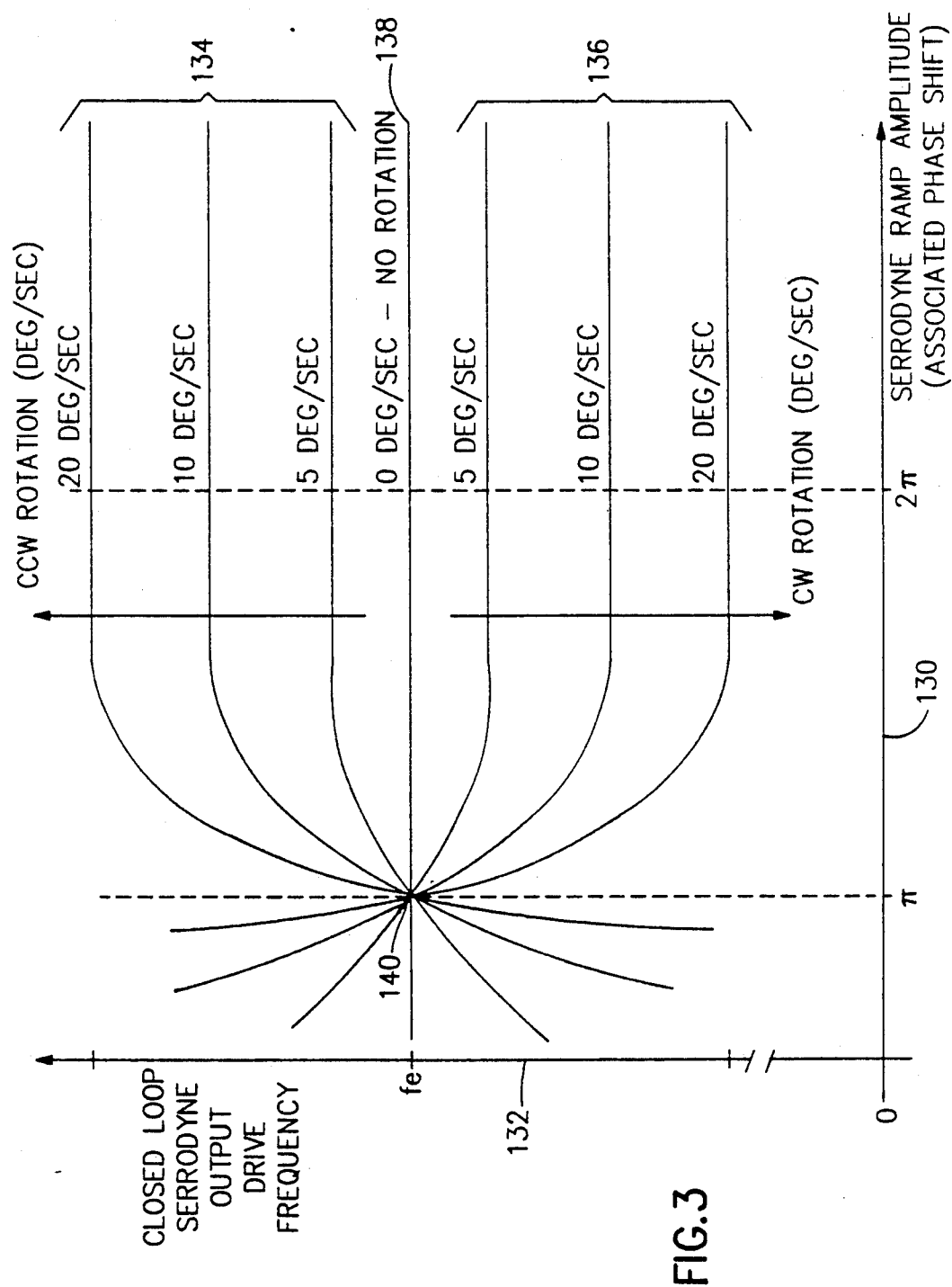
FIG. 3 is a graph of a family of curves representing the serrodyne output drive frequency as a function of both serrodyne output drive amplitude and rotation rate.

This principle is further illustrated by FIG. 3. The x-axis 130 and y-axis 132 represent the amplitude and the frequency of the serrodyne output drive signal respectively. For a given rotation rate and amplitude of the serrodyne drive signal, the y-axis of FIG. 3 gives the closed loop serrodyne drive output frequency required to null any induced phase shift and obtain a constant optical intensity averaged over the period of the serrodyne drive signal (i.e., the frequency of the signal on the output line 58 of the frequency control circuit). The family of curves 134 illustrates the relationship for CCW rotation, curves 136 for CW rotation, and curve 138 for no rotation. At the normal $2\pi$ radians fixed amplitude operating condition, the change in frequency required to satisfy the closed loop serrodyne drive system is proportional to rotation rate, as indicated by the family of curves 134,136,138. However, when the amplitude used is $\pi$ radians, the frequency at which this occurs is one unique frequency, Fe, as shown by the intersection of all the curves at the point 140.

Figure 4:
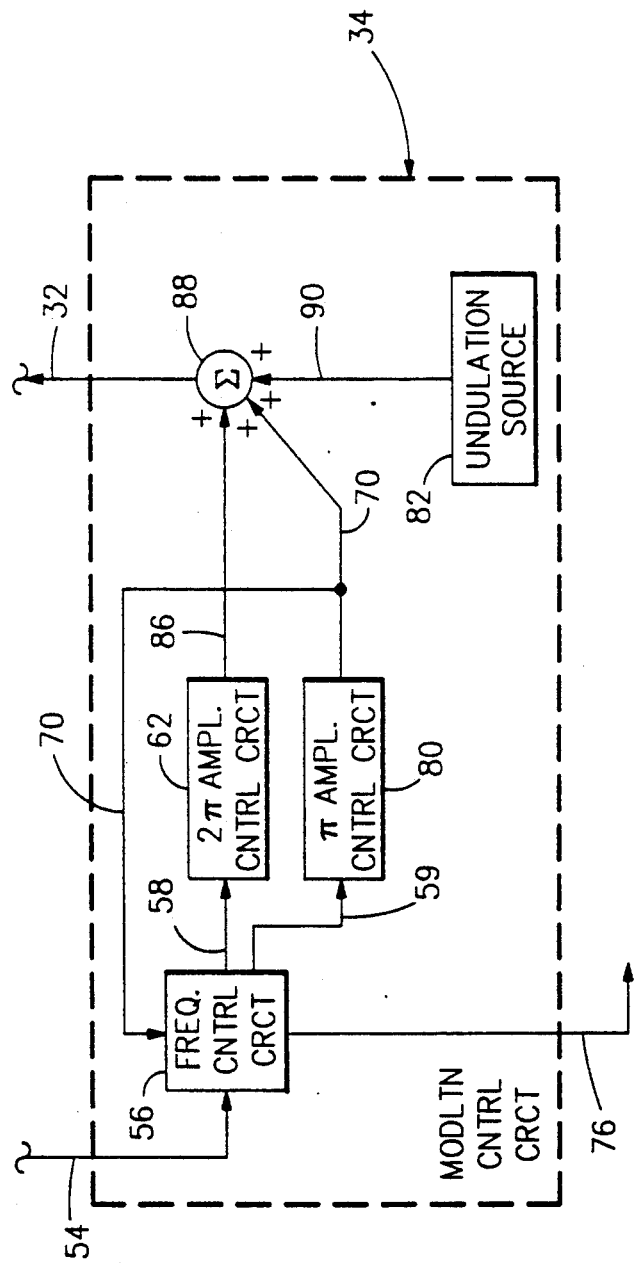
FIG. 4 is a schematic block diagram of an interferometric optical sensor having multiple simultaneous serrodyne waveforms applied and controlled in accordance with a second aspect of the invention.

Although the invention is illustrated in FIG. 1 as being implemented with a switched waveform, the invention will work equally as well using two independent serrodyne modulation waveforms with amplitudes π and 2π simultaneously applied to the phase modulator and controlled such that one frequency gives the loop Fe, and the other contains rotation information, as illustrated in FIG. 4. In this configuration, the value of the loop Fe is available continuously on the line 70 and rotation information on a line 86. The use of simultaneous waveforms in this alternative embodiment eliminates the switch 68 that selects between the π and 2π amplitudes, and the switch 74 that connects the undulation signal. The 2π amplitude signal on a line 86, the π amplitude signal on the line 70, and the undulation signal on a line 90 are fed to a summer 88 that replaces the summer 72 of FIG. 1, thereby continuously providing a drive signal on the line 32 comprising three combined waveforms.

To allow the simultaneous signals to be distinguished and minimize signal interaction in this alternative embodiment, the frequency control circuit for the π and 2π radians amplitudes should be based at different frequencies (such as π radians amplitude at Fe and 2π radians amplitude at 2Fe). Accordingly, the frequency control circuit in this embodiment produces two serrodyne waveform signals based at two different frequencies. An output line 59 provides a path for the additional signal. The use of simultaneous waveforms in this alternative embodiment eliminates the overhead associated with switching from the 2π radians amplitude control circuit to the π radians amplitude control circuit and undulation source, thereby eliminating the interruption in rotation rate detection during the time when the π radians amplitude is applied.

It is known that using a sensitizing oscillator and a synchronous demodulator both driven at Fe as their fundamental frequency, allow the FOG to exhibit optimal performance by reducing errors such as those resulting from optical backscatter and from spurious intensity modulations. It should be noted that a sensitizing oscillator and synchronous demodulator may be used with the present invention. Therefore, systems employing a sensitizing oscillator and synchronous demodulator may use the present invention to maintain optimal performance by adjusting the fundamental frequency to track any changes in the loop Fe.

Although the invention is illustrated primarily as applied to a rotation sensor, it will work equally as well in applications where optical phase differences between counter-propagating waves in the loop are induced by alternative perturbations, e.g., magnetic fields configured so as to yield a differential phase shift, rather than rotation. Furthermore, although the controlled modulation signal is illustrated as being a serrodyne ramp signal, other waveforms exhibiting similar phase shifting properties (symmetry) may be used, e.g. a parabolic periodic ramp or any non-linear periodic ramp with a flyback time that is short compared to the forward ramp time, and with an appropriate amplitude.

In addition, although the invention is illustrated as comprising in part an optical assembly which may provide optical splitting, filtering, and combining operations, along with a separate modulator assembly, the invention will work equally as well when implemented with the individual components combined in one or more IO devices, in a manner which should be apparent to one skilled in the art in light of the teachings herein.

Instead of using an undulation (or dither) source to fine tune the π amplitude, the invention may employ an open loop amplitude control without both the undulation source and π amplitude control logic, provided the π radians amplitude is precisely known. Alternatively, if the gyro or other target application has a known inherent mechanical dither similar to that induced by the undulation source, the undulation source is not required.

Furthermore, even though the invention is described as using only one phase modulator and one drive signal, it should be understood that the invention may also be implemented with a plurality of phase modulators driven by separate signals, one for each signal component (or a combination thereof) previously described as summed or switched into the modulator drive signal. In this configuration, the linearity of the optical system allows the individual effects of each drive signal to be optically combined, thereby forming the total modulation signal.

Instead of being implemented in dedicated hardware as described with respect to FIGS. 1 and 4, all of the functions of the present invention relating to the modulation control circuit 34 in FIGS. 1 and 4, may be implemented in software by suitable programming of a digital computer.

Although the invention has been described and illustrated with respect to certain exemplary embodiments thereof, it should be understood by those skilled in the art that various changes, omissions and additions may be made without departing from the spirit and the scope of the invention.

I claim:

1. An optical interferometer including an optical delay time determination system, comprising:
    an optical waveguide loop;
    means for providing a pair of light waves counter-propagating in said loop;
    means for combining said light waves after counter-propagating in said loop;
    detection means, responsive to said combined light waves, for providing an electrical detection signal having a component indicative of an optical phase difference between said combined light waves, resulting from a perturbation applied to said loop;
    modulator means, disposed in said loop, responsive to a drive signal, for inducing a phase difference between said counter-propagating light waves; and
    signal processing means, responsive to said detection signal, for providing a drive signal to said modulator means having an amplitude of a value that causes the time average of a characteristic of said component of said detection signal to equal a constant independent of said perturbation, thereby maintaining said time average of a characteristic of said component at a magnitude equal to that of said component which would exist in the absence of said perturbation, and for adjusting the frequency of said drive signal to achieve said constant time average of a characteristic of said component of said detection signal, where said adjusted frequency equals the drive frequency which would be obtained in the absence of a said perturbation.

2. Apparatus of claim 1, wherein said optical waveguide loop comprises an optical fiber.

3. Apparatus of claim 1, wherein said signal processing means further comprises means for providing an additional variation signal as part of said drive signal, and for adjusting the amplitude of a parameter of said drive signal until said component of said detection signal does not vary with said variation signal.

4. Apparatus of claim 1, wherein said signal processing means further comprises summing means for providing said drive signal as the sum of a plurality of waveforms.

5. Apparatus of claim 4, wherein said signal processing means further comprises means for switching a plurality of waveforms into said summing means, one of said waveforms being unrelated to said optical delay determination system.

6. Apparatus of claim 4, wherein said signal processing means further comprises means for providing a plurality of separate drive signal waveforms simultaneously into said summing means, one of said waveforms being unrelated to said optical delay determination system.

7. Apparatus of claim 5, further comprising a plurality of said modulator means, each for a separate waveform making up said drive signal, located at one end or both ends of said optical loop.

8. Apparatus of claim 1, wherein said drive signal comprises a periodic ramp waveform having an amplitude of $\pi$ radians.

9. Apparatus of claim 1, wherein said perturbation comprises a rotation rate of said loop about an axis perpendicular to said loop.

10. Apparatus of claim 1, wherein said optical interferometer is configured as a fiber optic gyroscope.

* * * * *

UNITED STATES PATENT AND TRADEMARK OFFICE
CERTIFICATE OF CORRECTION

PATENT NO. : 5,170,225

DATED : Dec. 8, 1992

INVENTOR(S) : CARL M. FERRAR

It is certified that error appears in the above-identified patent and that said Letters Patent is hereby corrected as shown below:

On the title page, insert --[73] Assignee: Honeywell Inc.--.

Signed and Sealed this

Second Day of November, 1993

Attest:

BRUCE LEHMAN

Attesting Officer

Commissioner of Patents and Trademarks